May 10, 1949. B. P. STRONG 2,469,483
MOUNTING FOR ANTIFRICTION BEARING
Filed Jan. 26, 1948
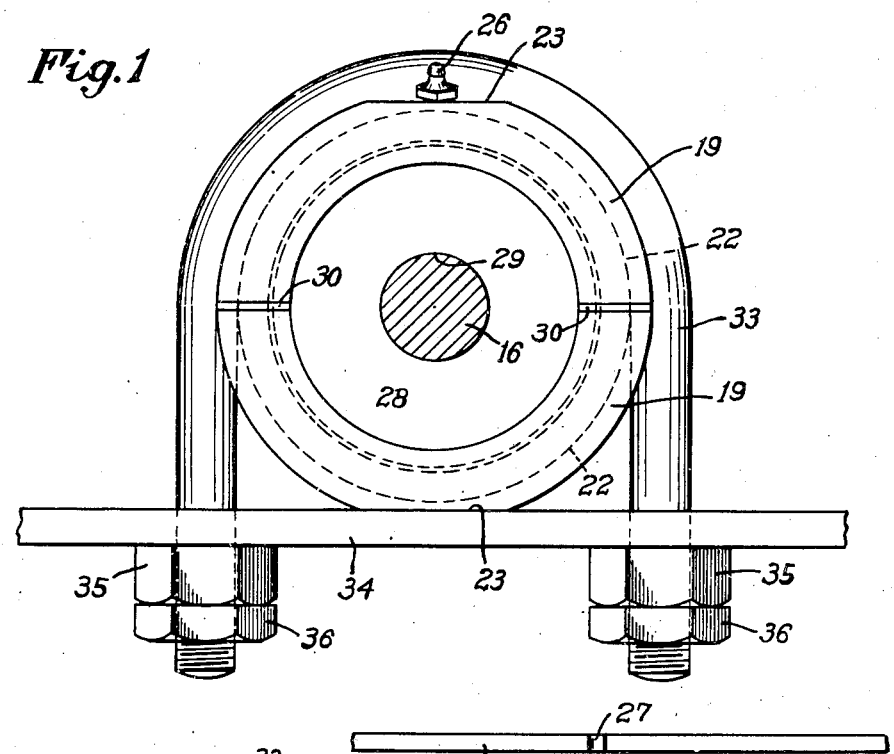
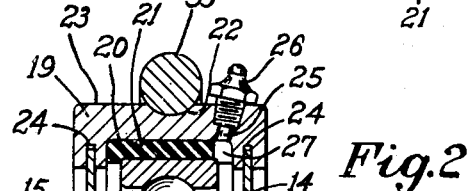
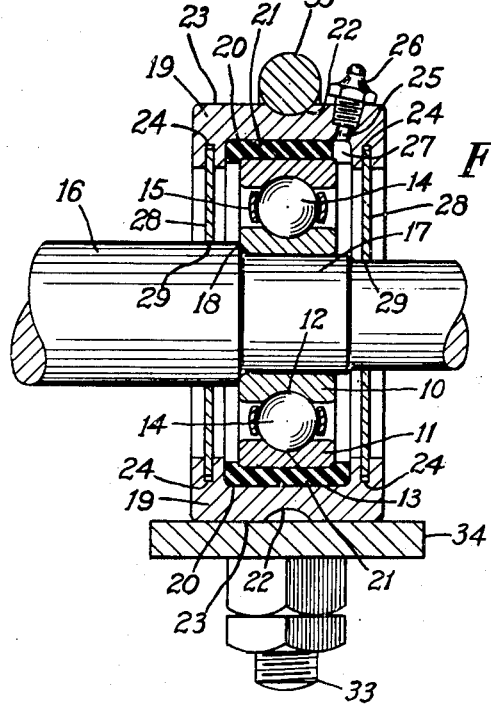
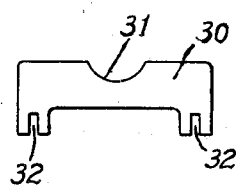
Inventor
Basil P. Strong
By Frease & Bishop
Attorneys Patented May 10, 1949

2,469,483

UNITED STATES PATENT OFFICE 2,469,483

MOUNTING FOR ANTIFRICTION BEARINGS

Basil P. Strong, Atwater, Ohio

Application January 26, 1948, Serial No. 4,405

6 Claims. (Cl. 308—184)

The invention relates to anti-friction bearings, and more particularly to a cushioned mounting or support for ball bearings.

An object of the invention is to provide such a device in which no stress is set up in any member or part of the bearing, due to misalignment or mismounting of the bearing upon the shaft, within reasonable variation.

Another object is to provide such a bearing mounting in which the housing is not tightened down until the bearing is in its normal position, so that there is no initial stress in the flexible member.

A further object is to provide such a mounting in which stress is set up in the flexible member only when there is flexing in the housing in which the bearing is secured.

A still further object is to provide such a bearing mounting cushioned by means of a thin, flat flexible strip which will withstand heavier loads than a thick flexible material, and which is also less expensive.

Another object is to provide such a device in which the housing contains the bearing within fixed limits.

Still another object is to provide a bearing mounting of the character referred to having end rings which not only form a grease chamber but also hold the two parts of the housing in their respective positions and float with the shaft when flexing of the frame occurs.

The above objects, together with others which will be apparent from the drawing and following description, or which may be later referred to, may be attained by constructing the improved mounting for anti-friction bearings in the manner hereinafter desscribed in detail and illustrated in the accompanying drawing, in which:

Figure 1 is a side elevation of a cushioned ball bearing mounting embodying the invention;

Fig. 2 a longitudinal sectional view through the same;

Fig. 3 a detached plan view of one end of the gasket located between abutting surfaces of the housing members; and Fig. 4 a longitudinal edge elevation of one of the flexible strips which form a cushion for the bearing.

Although the invention is applicable to the mounting of various types of anti-friction bearings, for the purpose of illustration a ball bearing of conventional design is shown comprising the inner bearing ring 10 and the outer bearing ring 11 having the opposed annular grooves or ball races 12 and 13 in which the balls 14 are adapted to run as in usual practice, the balls being preferably retained within a conventional cage 15.

The inner ring 10 of the bearing is fixed upon the shaft 16 in any usual and well known manner, preferably having a drive fit upon the reduced portion 17 of the shaft, the adjacent side of the ring bearing against the shoulder 18 of the shaft.

The improved mounting for the bearing includes a housing formed of two similar, semi-circular housing members 19 each of which has a semi-circular groove or channel 20 formed in its inner side, said grooves being substantially flat in cross section as shown in Fig. 2.

In order to cushion the bearing within the housing a flat, relatively thin strip of rubber, or other flexible material, indicated generally at 21, is located within the groove 20 of each semicircular housing member 19.

A rounded, annular groove 22 is formed in the exterior side of each housing member 19, being centrally located therein as best shown in Fig. 2 and each housing member 19 preferably has the centrally located flat portion 23 upon its exterior.

Each of the housing members 19 has an annular groove 24 in its inner side, said grooves being spaced from opposite sides of the groove 20. The upper housing member 19 is provided with an opening 25 extending through from the exterior flat portion 23 to the central annular channel or groove 20 and a grease fitting 26, of any usual and well known type, is mounted therein for supplying grease to the interior of the housing. For this purpose an aperture or notch 27 is formed in the adjacent edge portion of the flexible cushion member 21.

A flexible end ring or washer 28, formed of fiber, sheet aluminum or the like, is fitted within the internal annular groove 24 in each side of the housing members 19, said rings or washers being of less diameter than the grooves, as best shown in Fig. 2, so as to hold the two sections of the housing in their proper positions and float with the shaft when flexing of the frame occurs. These rings or washers have the central apertures 29 fitting upon the respective portions of the shaft.

Gaskets 30, preferably shaped as shown in Fig. 3, with central, semi-circular cutout 31 to conform to the external, annular grooves 22 in the housing members, and with notches 32 near each end to conform to the internal annular grooves 24 in the housing members, are located between the opposed ends of the housing members and the entire assembly is drawn together by means of a U-bolt 33, located within the external annular grooves 22 in the housing members and through suitable apertures in the frame plate 34.

The flat face 23 of the lower housing member 19 rests upon the frame plate 34, and nuts 35 upon the screw threaded ends of the U-bolt draw the assembly together, slightly compressing the flexible cushion strips 21 between the housing members and the outer track ring 11 of the roller bearing, as best shown in Fig. 2. Lock nuts 36 may be placed upon the threaded ends of the U-bolt, in contact with the clamping nuts 35, for holding them in adjusted position.

With this construction the end rings 28 enclose a grease chamber within which the bearing operates under complete lubrication admitted through the grease fitting 26. As the rings 28 fit tightly upon the shaft and extend into the grooves 24 in the housing member, the grease chamber thus formed is sealed against leakage of lubricant.

I claim:

1. A mounting including inner and outer bearing rings with interposed anti-friction bearing members, a pair of substantially semi-circular housing members embracing said outer bearing ring, said housing members having circumferentially extending channels therein, flat, flexible strips located in said channels, a shaft mounted through the inner bearing ring, and means clamping said housing members together upon the outer bearing ring, said housing members having annular grooves therein on opposite sides of said channel, and end rings fitting around the shaft and extending into said grooves forming a chamber enclosing the bearing rings.

2. A mounting including inner and outer bearing rings with interposed anti-friction bearing members, a pair of substantially semi-circular housing members embracing said outer bearing ring, said housing members having circumferentially extending channels therein, flat, flexible strips located in said channels, a shaft mounted through the inner bearing ring, and means clamping said housing members together upon the outer bearing ring, said housing members having annular grooves therein on opposite sides of said channel, and end rings fitting around the shaft and extending into said grooves forming a chamber enclosing the bearing rings, said grooves being of greater diameter than said end rings.

3. A mounting including inner and outer bearing rings with interposed anti-friction bearing members, a pair of substantially semi-circular housing members embracing said outer bearing ring, said housing members having circumferentially extending channels therein, flat, flexible strips located in said channels, a shaft mounted through the inner bearing ring, and means clamping said housing members together upon the outer bearing ring, said housing members having annular grooves therein on opposite sides of said channel, and end rings fitting around the shaft and extending into said grooves forming a chamber enclosing the bearing rings, and means for admitting lubricant to said chamber.

4. A mounting including inner and outer bearing rings with interposed anti-friction bearing members, a pair of substantially semi-circular housing members embracing said outer bearing ring, said housing members having circumferentially extending channels therein, flat, flexible strips located in said channels, a shaft mounted through the inner bearing ring, and means clamping said housing members together upon the outer bearing ring, said housing members having annular grooves therein on opposite sides of said channel, and end rings fitting around the shaft and extending into said grooves forming a chamber enclosing the bearing rings, said grooves being of greater diameter than said end rings, and means for admitting lubricant to said chamber.

5. A mounting including inner and outer bearing rings with interposed anti-friction bearing members, a pair of substantially semi-circular housing members embracing said outer bearing ring, said housing members having circumferentially extending channels therein, flat, flexible strips located in said channels, a shaft mounted through the inner bearing ring, a frame plate in contact with one of said housing members, a U-bolt embracing the other housing member and means clamping said U-bolt and said frame plate together, said housing members having annular grooves therein on opposite sides of said channel, end rings fitting around the shaft and extending into said grooves forming a chamber enclosing the bearing rings, and means clamping said housing members together upon the outer bearing ring.

6. A mounting including inner and outer bearing rings with interposed anti-friction bearing members, a pair of substantially semi-circular housing members embracing said outer bearings ring, said housing members having circumferentially extending channels therein, flat, flexible strips located in said channels, a shaft mounted through the inner bearing ring, a frame plate in contact with one of said housing members, a U-bolt embracing the other housing member and means clamping said U-bolt and said frame plate together, said housing members having annular grooves therein on opposite sides of said channel, and rings fitting around the shaft and extending into said grooves forming a chamber enclosing the bearing rings, means for admitting lubricant to said chamber, and means clamping said housing members together upon the outer bearing ring.

BASIL P. STRONG.

REFERENCES CITED

The following references are of record in the file of this patent:

UNITED STATES PATENTS

| Number | Name | Date |
| --- | --- | --- |
| 1,636,565 | Howe | July 19, 1927 |
| 2,102,415 | Herreshoff | Dec. 14, 1937 |